E. R. KAST.
SIGNATURE GATHERER.
APPLICATION FILED AUG. 31, 1912.
1,287,334.
Patented Dec. 10, 1918.
16 SHEETS—SHEET 2.
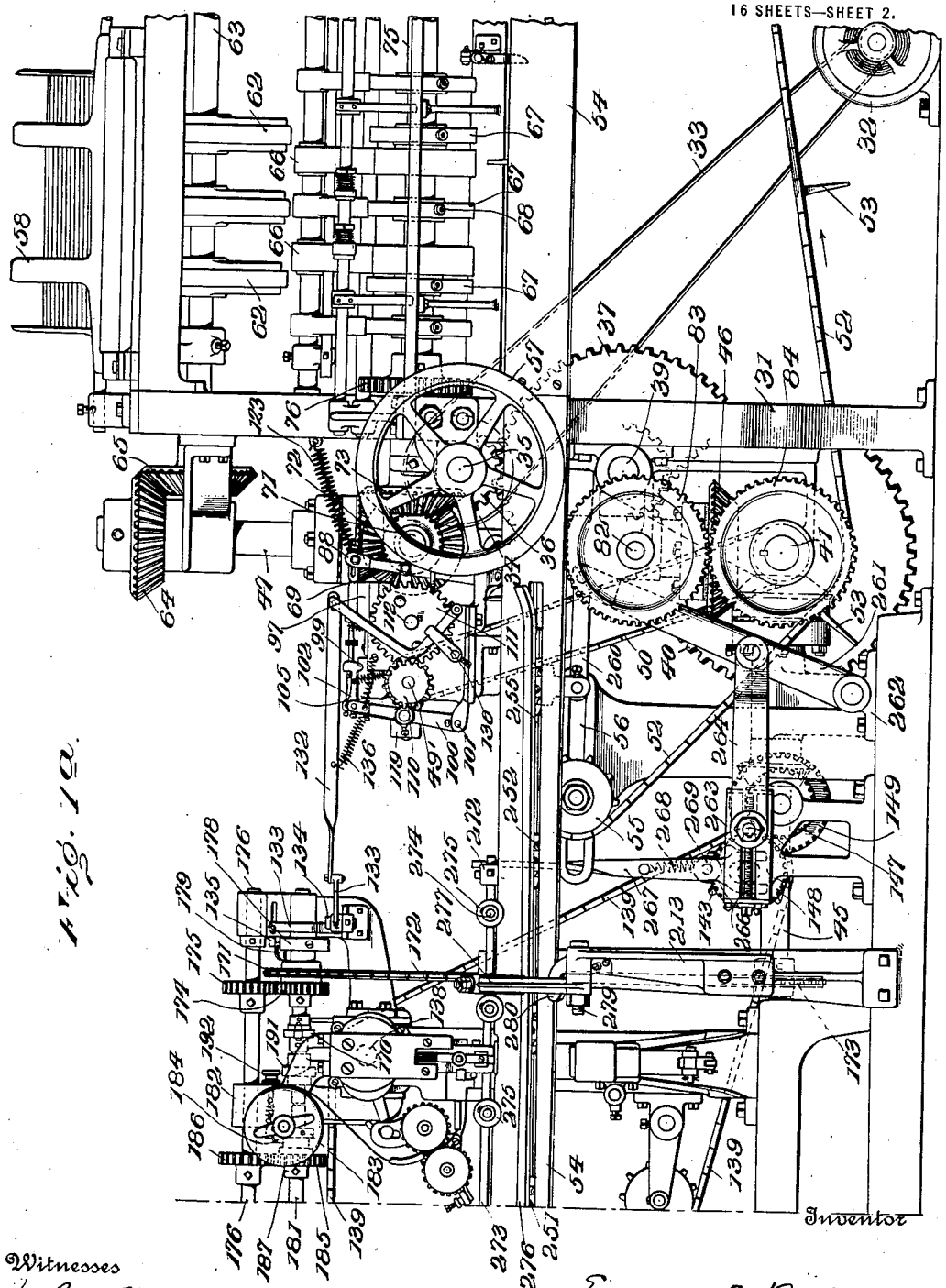

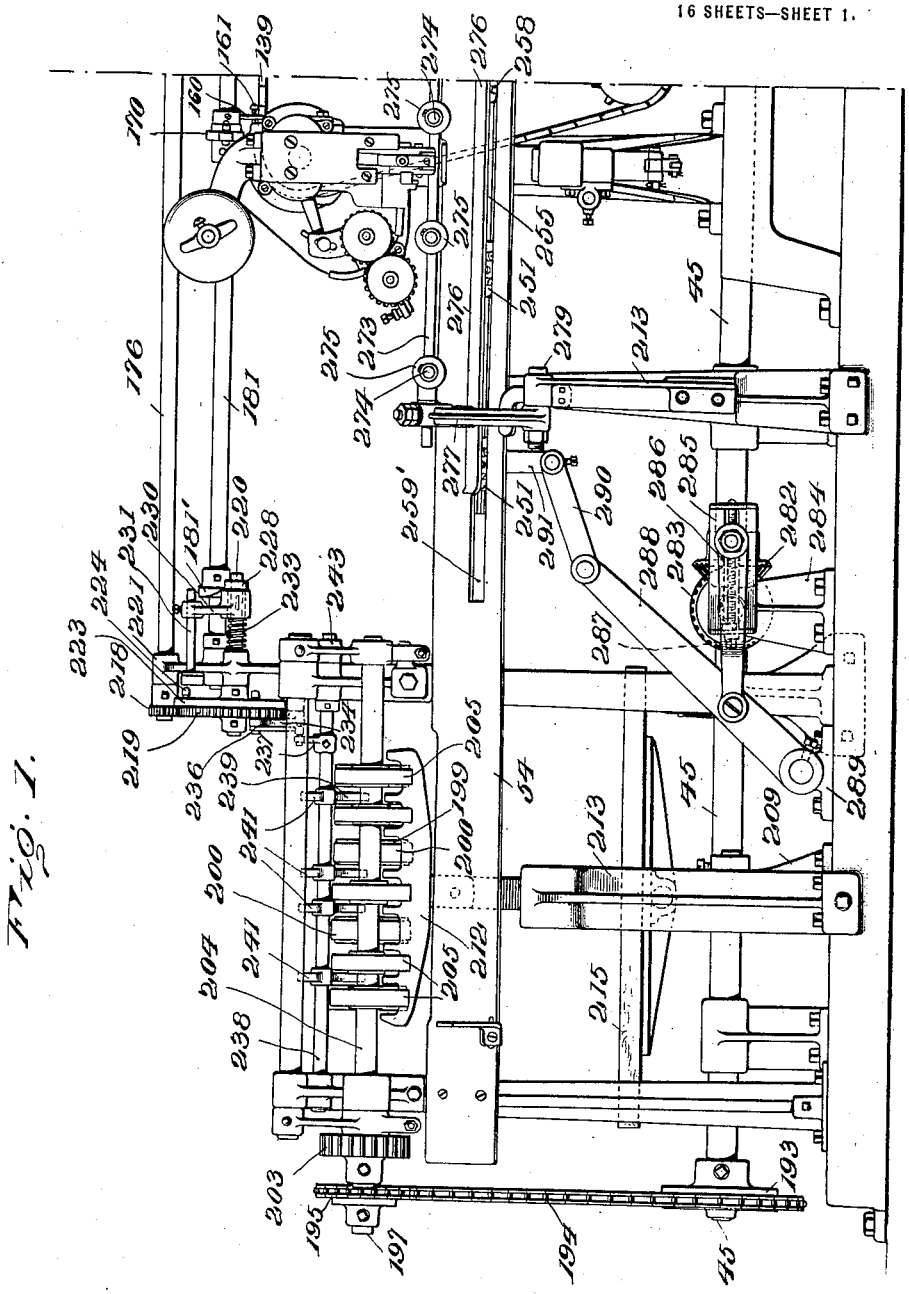

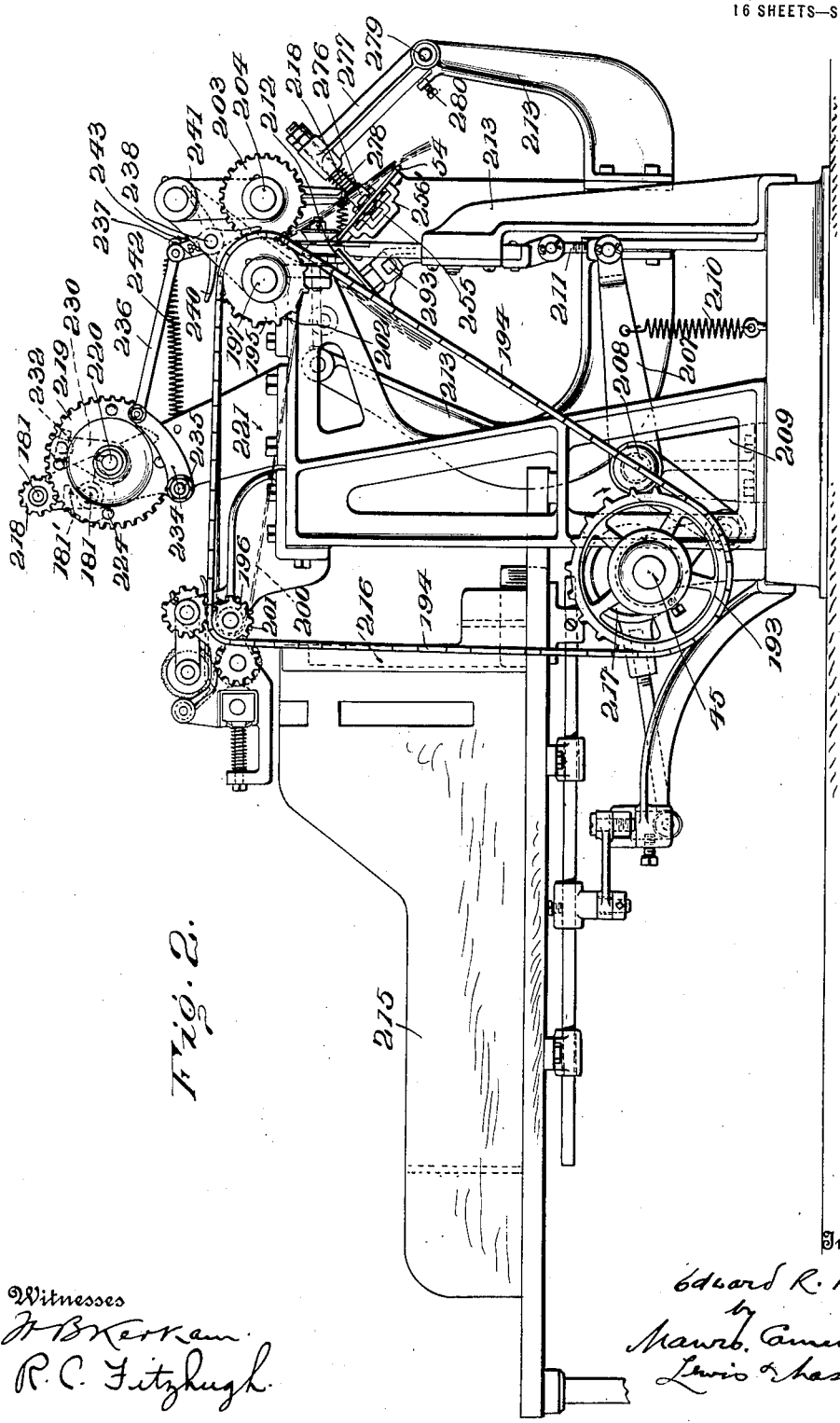

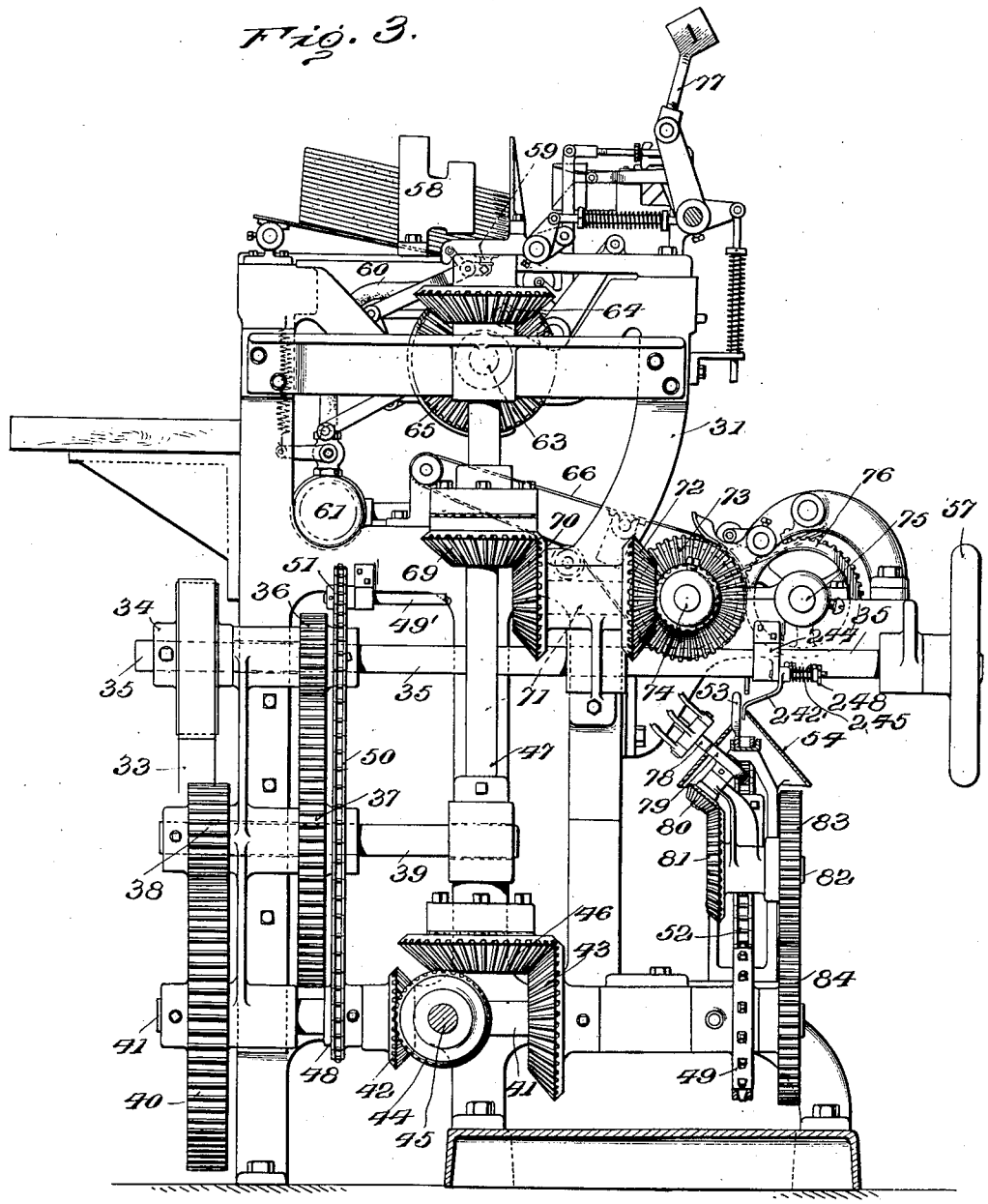

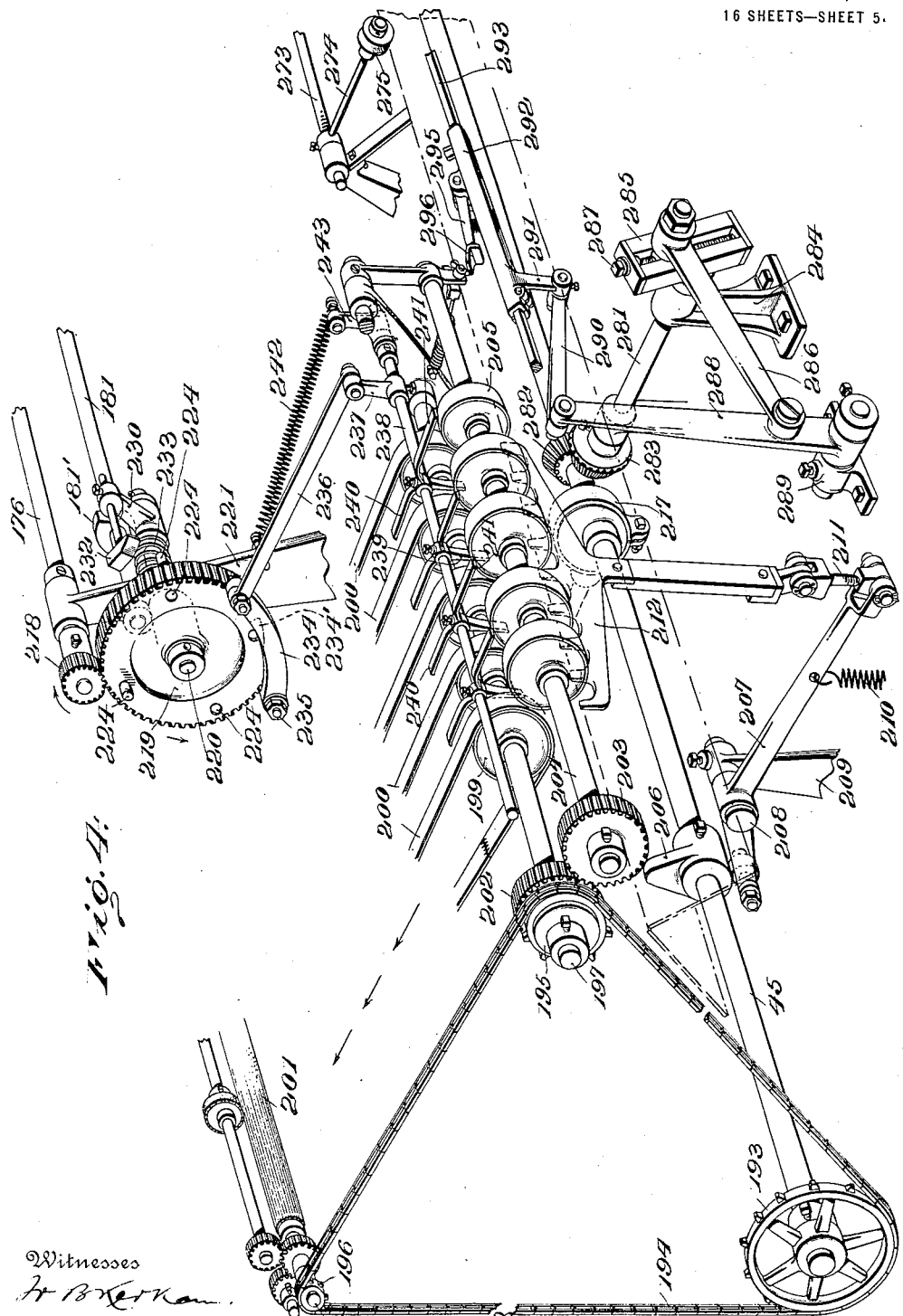

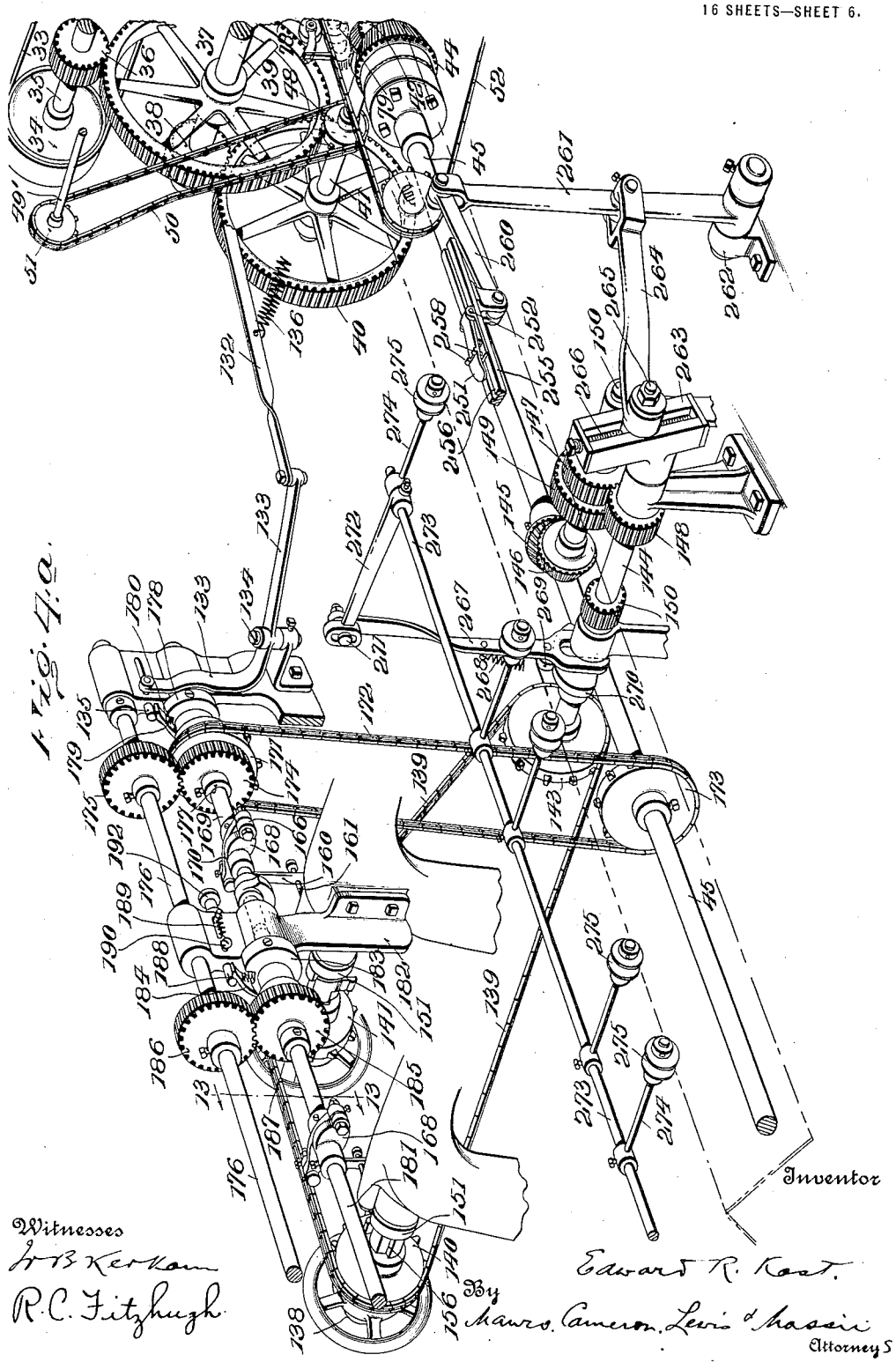

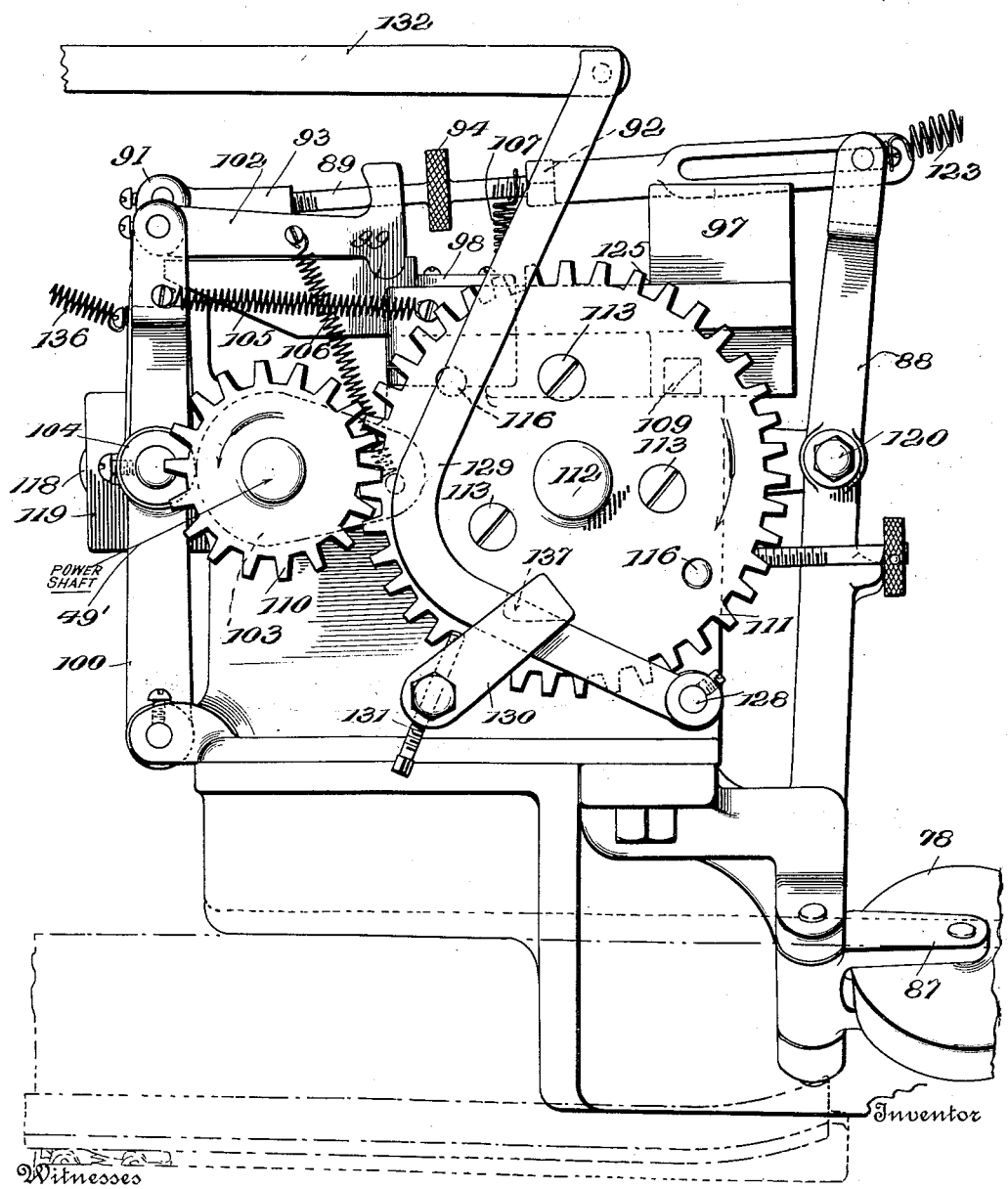

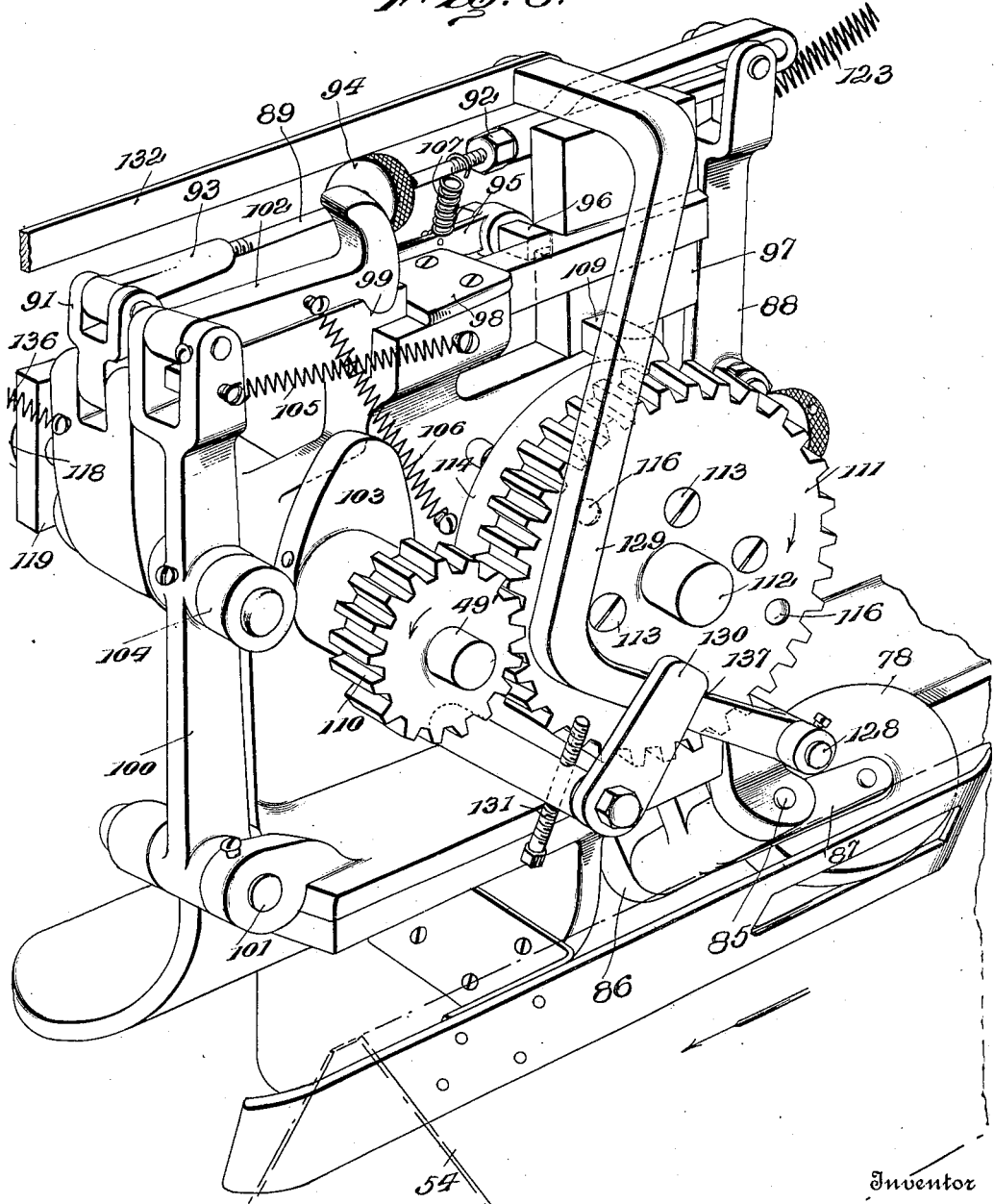

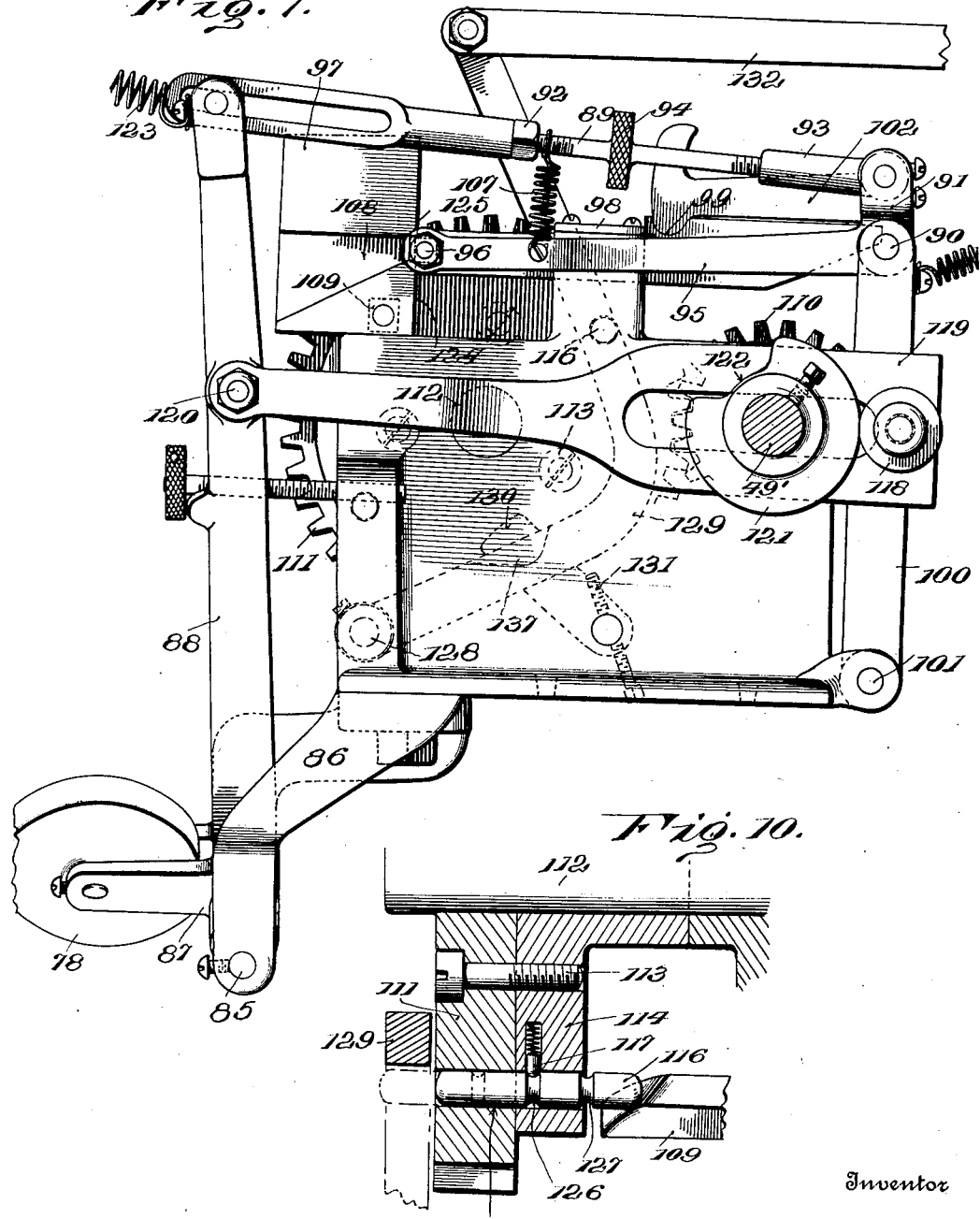

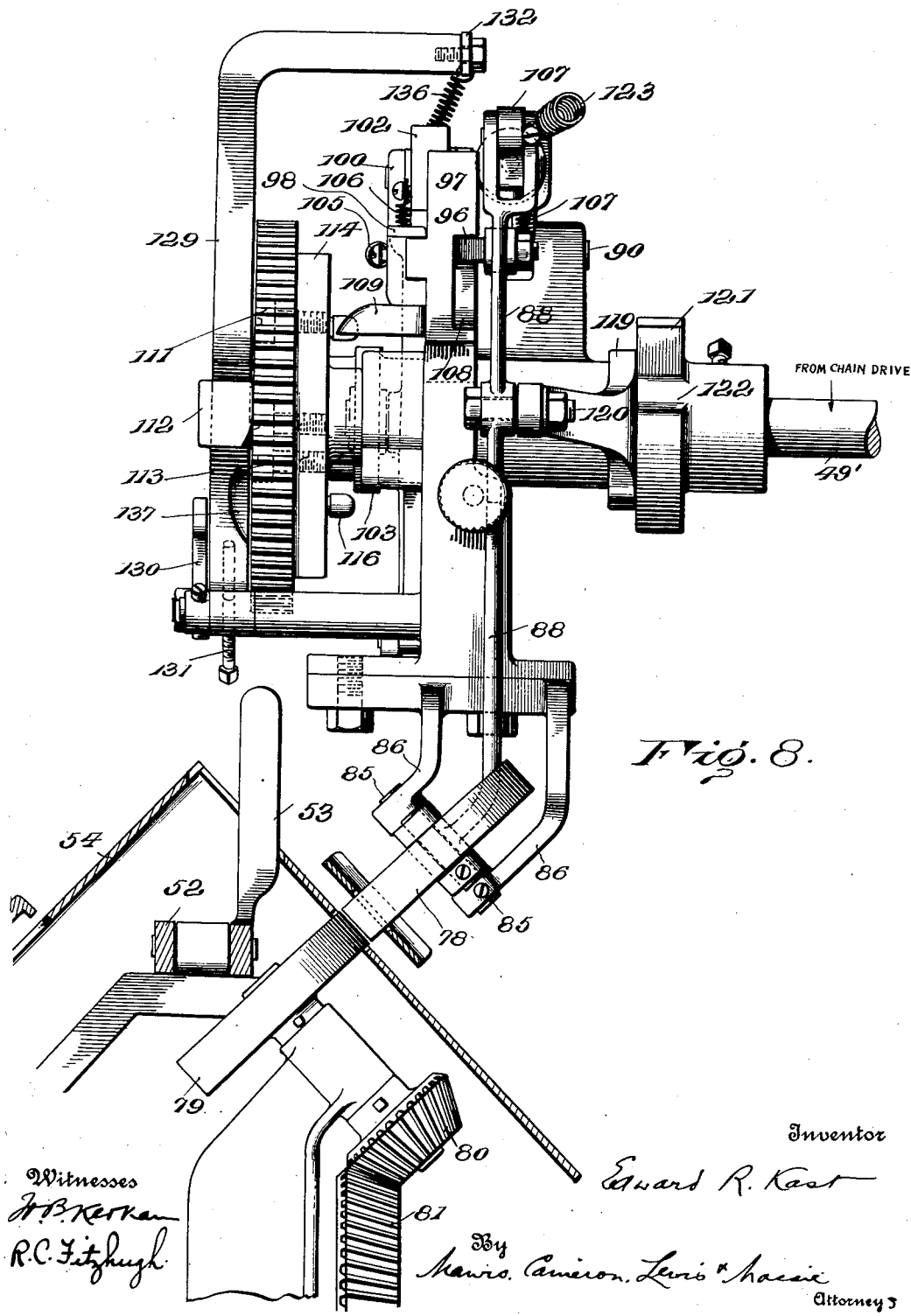

E. R. KAST.
SIGNATURE GATHERER.
APPLICATION FILED AUG. 31, 1912.
1,287,334.
Patented Dec. 10, 1918.
16 SHEETS—SHEET 11.
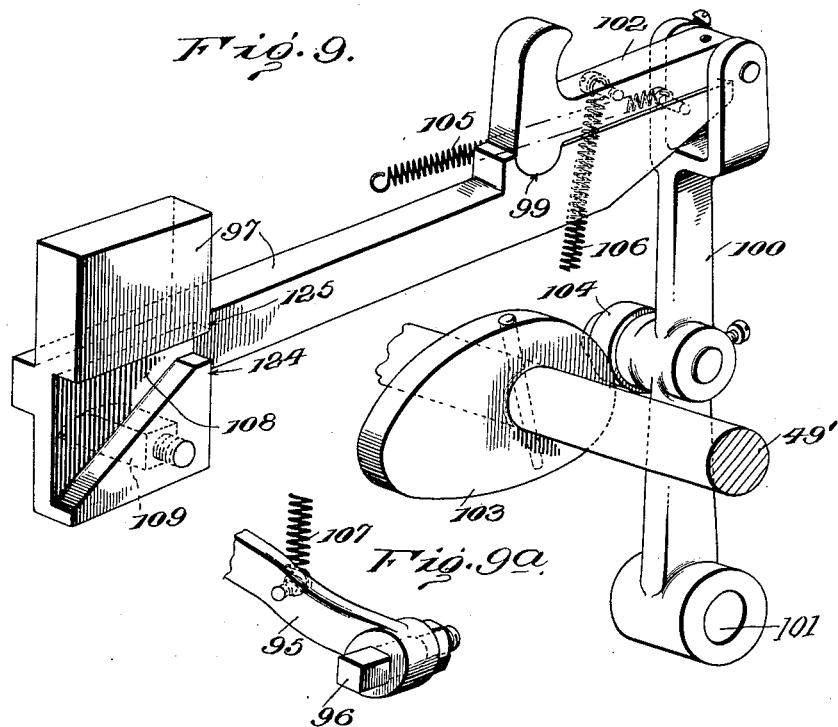
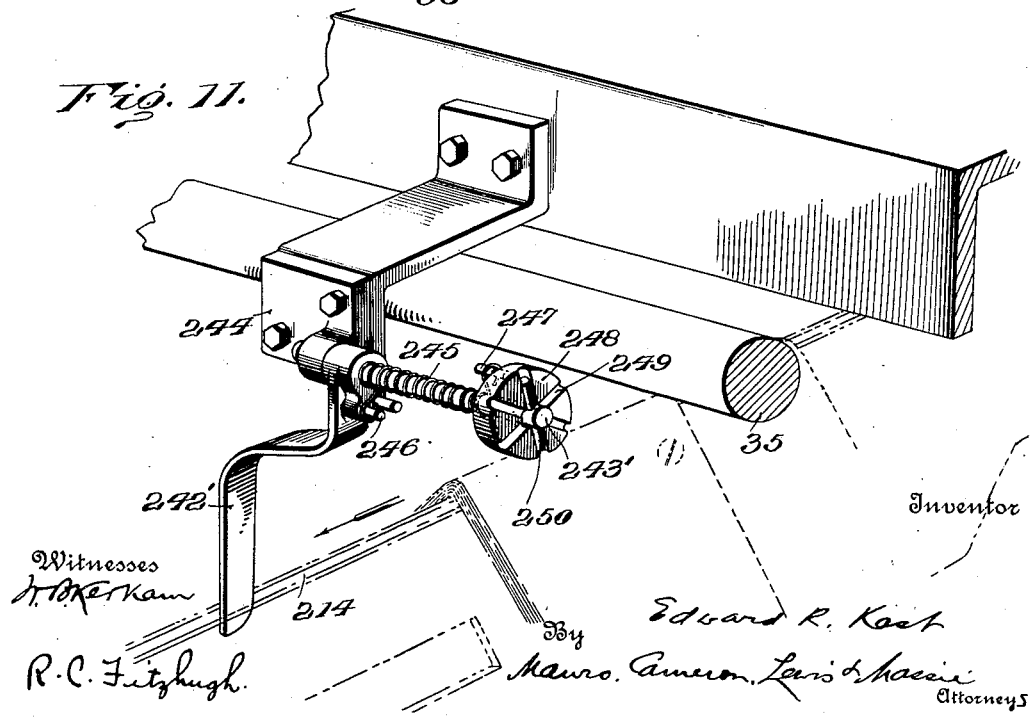

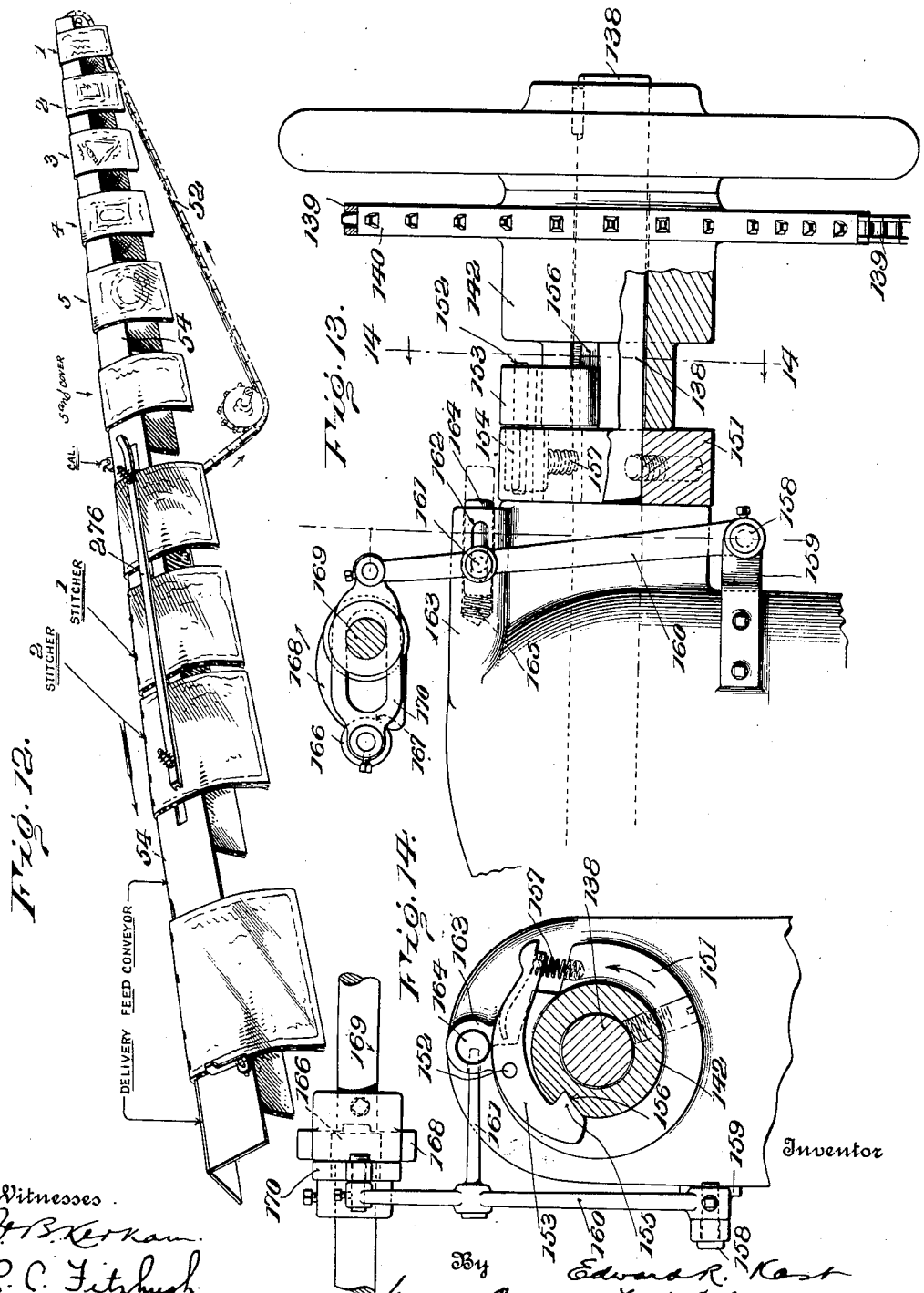

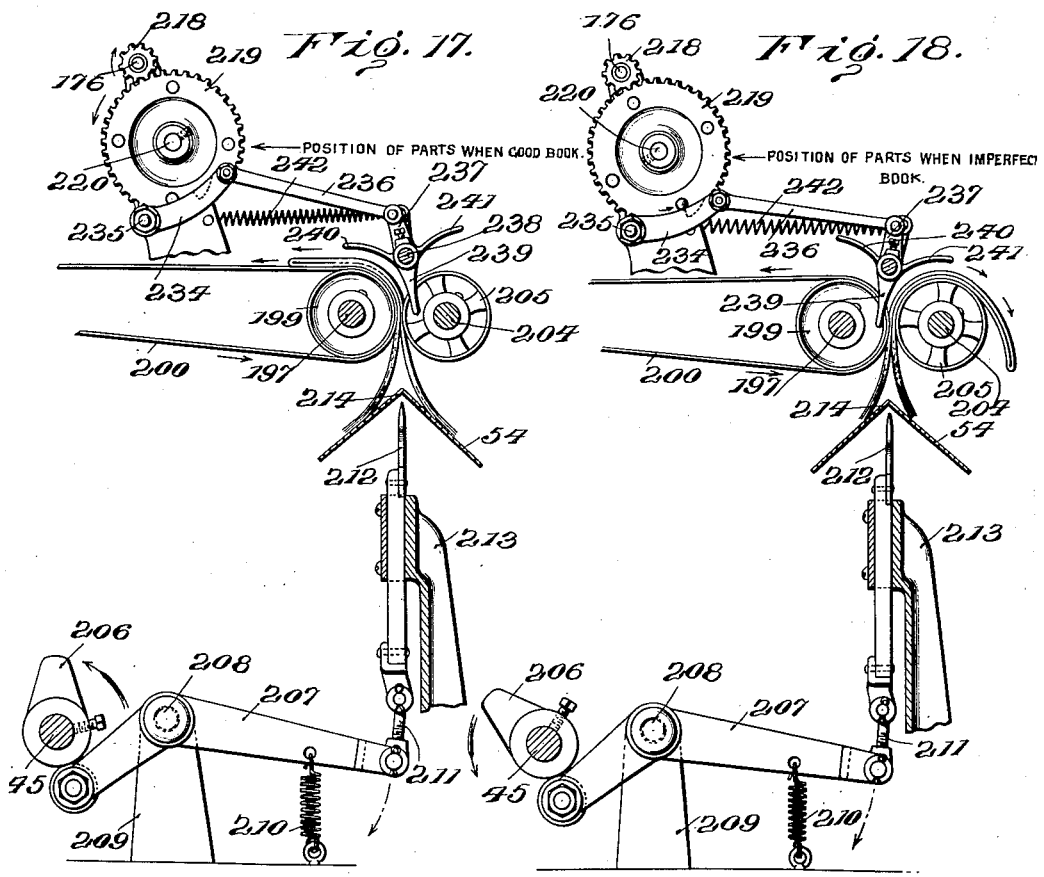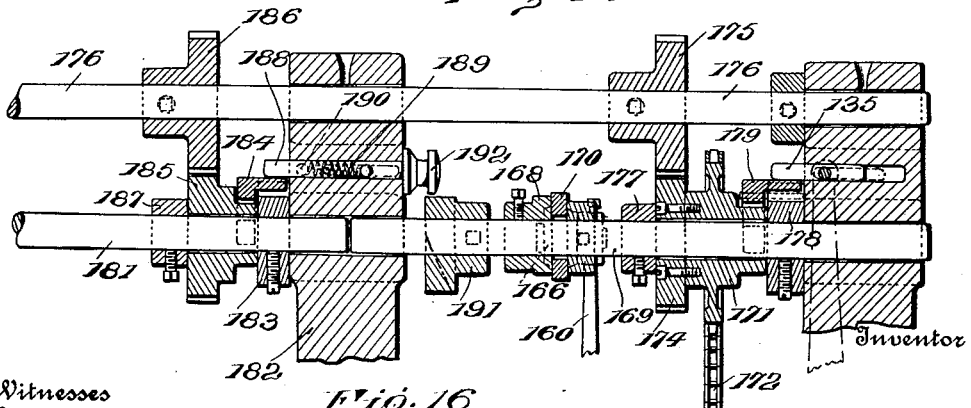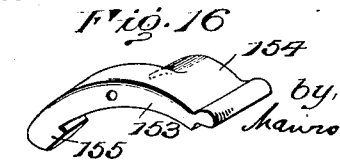

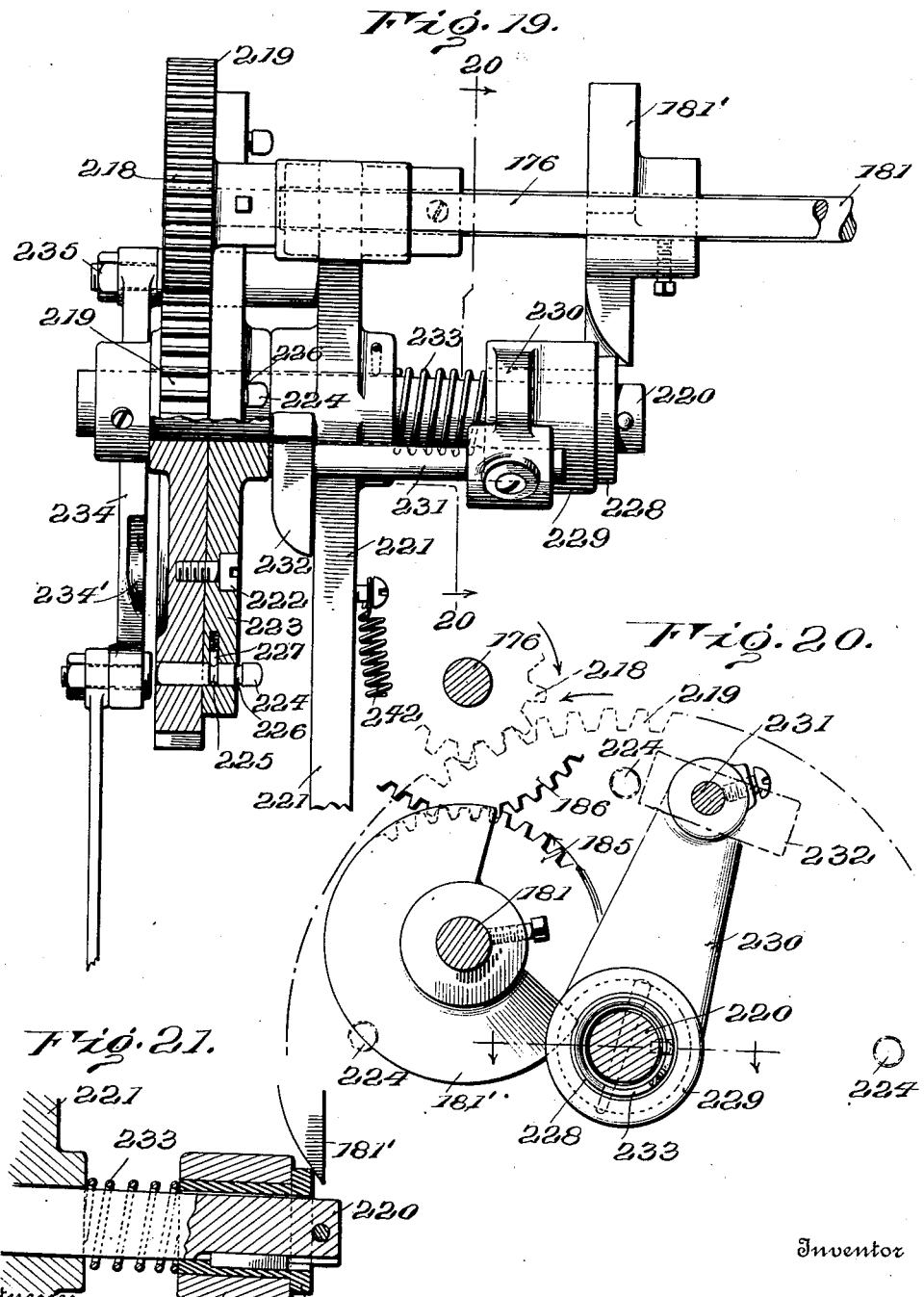

E. R. KAST.
SIGNATURE GATHERER.
APPLICATION FILED AUG. 31, 1912.
1,287,334.
Patented Dec. 10, 1918.
16 SHEETS—SHEET 15.
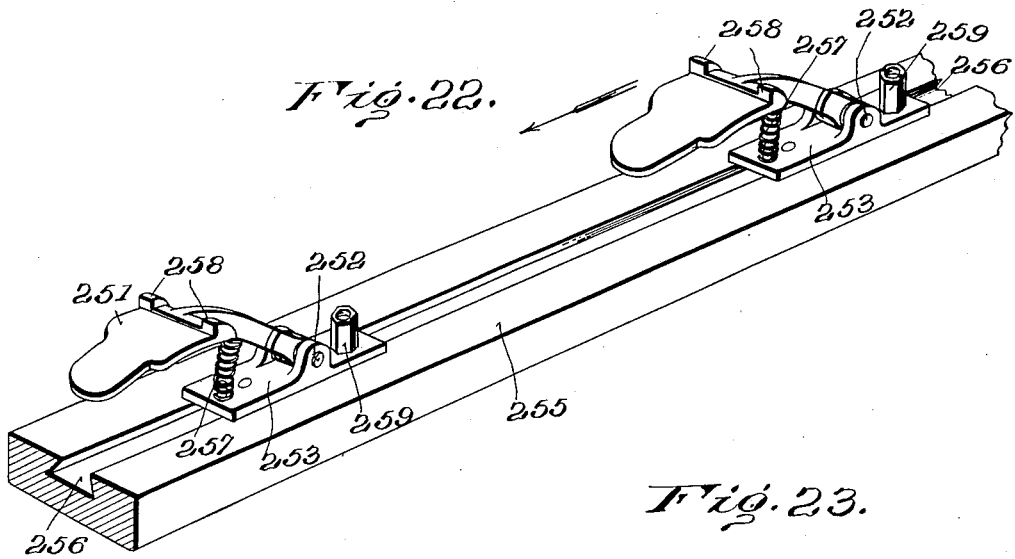
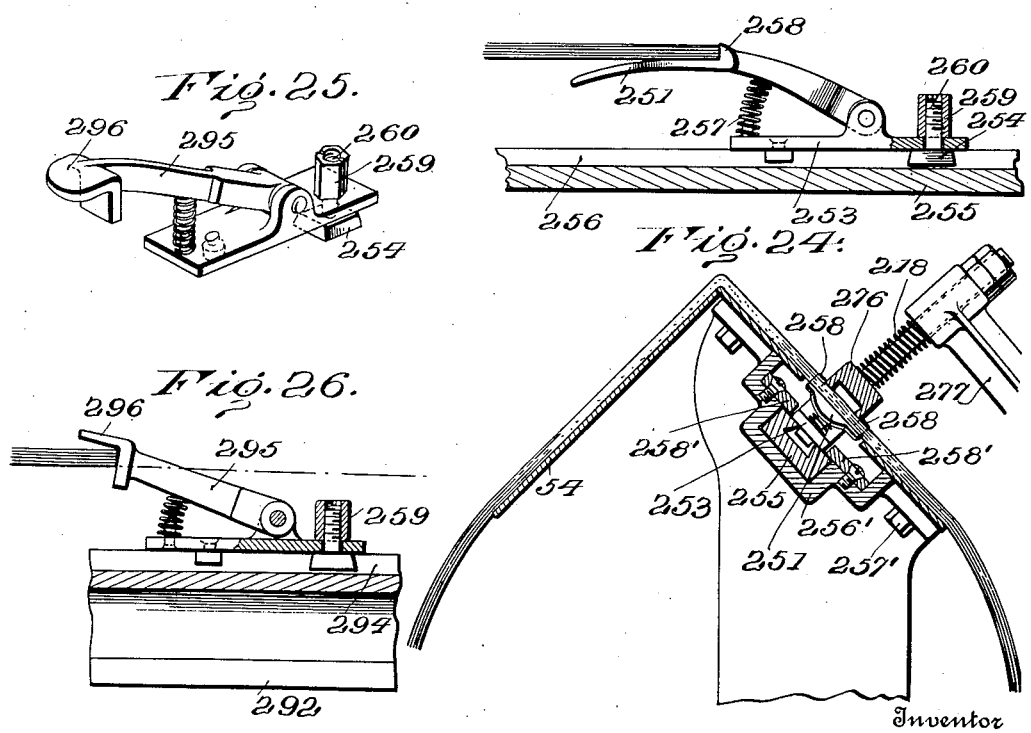

E. R. KAST.
SIGNATURE GATHERER.
APPLICATION FILED AUG. 31, 1912.

1,287,334.

Patented Dec. 10, 1918.
16 SHEETS—SHEET 16.

UNITED STATES PATENT OFFICE.

EDWARD R. KAST, OF BALTIMORE, MARYLAND, ASSIGNOR TO KAST INSETTING AND GATHERING MACHINE COMPANY, A CORPORATION OF DELAWARE.

SIGNATURE-GATHERER.

1,287,334.     Specification of Letters Patent.     Patented Dec. 10, 1918.

Application filed August 31, 1912. Serial No. 718,062.

*To all whom it may concern:*

Be it known that I, EDWARD R. KAST, of Baltimore, Maryland, have invented a new and useful Improvement in Signature-Gatherers, which invention is fully set forth in the following specification.

The present invention relates to machines for assembling and stitching signatures, and the particular object of the invention is to provide a machine in which the operation of the stitching mechanism or mechanisms is controlled from a calipering device; that is to say, when the assembled signatures that pass under the calipering device are for any reason defective, the stitching mechanism or mechanisms will be automatically disconnected upon the passage of said defective book, and if more than one stitching mechanism is employed said mechanisms will be successively disconnected. The invention further resides in the provision of an automatic delivery provided with means controlled by said calipering mechanism whereby the defective book or books are automatically delivered in a separate path from that of the good books.

Preferably the means for assembling signatures is that shown, described and claimed in my Patent No. 1,236,181, but it is to be understood that any other means for assembling signatures will suffice. In my patent above referred to, a calipering device is shown associated with each hopper containing signatures, said calipering device acting to automatically stop the machine should the withdrawing mechanism withdraw more or less than the predetermined number of signatures or a defective signature. The present invention further resides in the provision of means for absolutely insuring the delivery of perfect books, by the employment of a calipering device which engages the assembled signatures, so that if, for any reason, any one of the calipering mechanisms associated with the respective hoppers should have failed to perform its function, the calipering device acting on the assembled signatures constituting the book will disconnect the stitching mechanism or mechanisms as the defective book passes the same.

The invention further resides in numerous improvements that are illustrated in the drawings, and that will be hereinafter described and claimed.

The invention will be more fully understood by reference to the accompanying drawings, illustrating one expression of the inventive idea, and wherein—

Figures 1 and 1ª are a side elevation of the machine, one hopper for signatures and its associated mechanism, such as described and claimed in my Patent No. 1,236,181 being shown;

Fig. 2 is an end elevation of the machine showing the delivery;

Fig. 3 is an end elevation of the mechanism for assembling the signatures, showing particularly the arrangement of the driving means;

Figure 27:
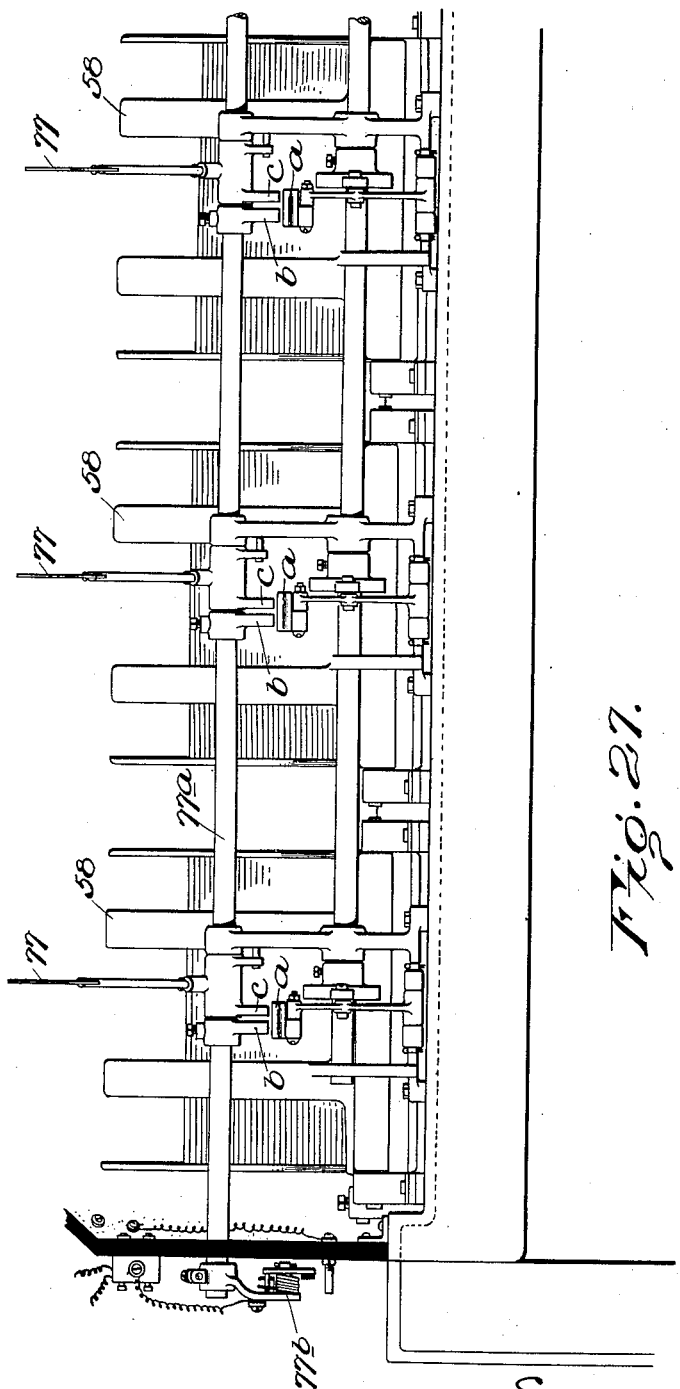

Figs. 4 and 4ª are a detached perspective view illustrating, among other things, the power connections to the various parts of the machine;

Fig. 5 is a detail showing in front elevation the calipering mechanism that acts on the assembled signatures, and associated parts;

Fig. 6 is a perspective view of the same;

Fig. 7 is a view similar to Fig. 5, looking in the opposite direction;

Fig. 8 is an end elevation looking toward the right in Fig. 7;

Figs. 9, 9ª and 10 are details;

Fig. 11 is a detail perspective, illustrating a device for alining the assembled signatures as they pass along the saddle;

Fig. 12 is a detached perspective view, illustrating the saddle and the relation of a number of signatures thereon, a six-hopper insetting machine being indicated;

Fig. 13 is a cross-section, partly in elevation, and some of the parts removed for the sake of clearness on the line 13—13, Fig. 4ª;

Fig. 14 is a cross-section, partly in elevation, on the line 14—14, Fig. 13;

Fig. 15 is a detail, in longitudinal section, of part of the means for disconnecting the stitching mechanisms;

Fig. 16 is a perspective view of a pawl;

Figs. 17 and 18 are detail views, in elevation, illustrating the switch that controls the path of discharge of good and defective books;

Fig. 19 is a plan view of part of the delivery mechanism;

Fig. 20 is a transverse section on the line 20—20, Fig. 19;

Fig. 21 is a detail of part of the mechanism for setting the stops at the delivery;

Figs. 22, 23, 24, 25 and 26 are details, illustrating the dogs that engage the books to feed them along the saddle; and Fig. 27 is a partial front elevation showing several of the hoppers and the associated individual calipers.

Referring to the drawings, wherein similar letters of reference indicate like parts, 31 is the frame of the machine of any suitable or desired construction. Any suitable means may be employed for supplying power to the machine, which means are here shown in the form of an electric motor 32 driving belt 33 which acts, through a pulley 34 and shaft 35, to drive a pinion 36 which in turn acts through gear 37 and pinion 38 on countershaft 39 to drive a gear 40 on shaft 41. Bevel gears 42 and 43 are keyed to said shaft. The former acts through bevel gear 44 to impart motion to shaft 45, and the latter acts, through bevel gear 46 to impart movement to vertical shaft 47. Sprocket wheels 48 and 49 are also mounted on said shaft, sprocket wheel 48 driving shaft 49', which is associated with the calipering mechanism hereinafter described, through sprocket chain 50 and sprocket wheel 51 mounted on said shaft 49'; and sprocket wheel 49 drives conveyer chain 52, provided with pins 53, which chain is associated with the inverted V-shaped saddle 54. Said chain passes around a sprocket 55 (Fig. 1ᵃ), adjustable in a slot 56 in the frame of the machine, in order to lengthen or shorten said chain.

On one end of shaft 35 through which power is transmitted to the whole machine, is a hand-wheel 57 by which the parts of the machine may be manually moved or adjusted to any desired position.

Any suitable or desired mechanism for assembling the signatures may be employed, but preferably that shown and described in my Patent No. 1,236,181 is used. In the accompanying drawings (Figs. 1ᵃ, 3 and 27) are shown a plurality of hoppers 58, any desired number being employed, the signatures deposited on the saddle 54 from one hopper being carried along said saddle by the conveyer chain 52 under the next hopper where said signature is inset in a signature from the second hopper, and so on throughout the machine. As herein illustrated, the lowermost signature in the hopper is drawn downward by means of suitably-operated oscillating sucker mouths 59, connected to a source of suction (not shown) by pipes 60 and 61. The signature thus drawn downward is seized by its folded edge by a series of signature-withdrawing devices 62 and said signature is thus withdrawn from the bottom of the pile. The withdrawing devices are preferably in the form of semi-cylindrical surfaces keyed to the shaft 63, to which motion is applied from vertical shaft 47 through bevel gears 64 and 65, gripping fingers carried by said surfaces acting to clamp the signature and to release the same at the proper time, as fully set forth in my said Patent No. 1,236,181.

The signature having been withdrawn from the hopper, it falls from the signature-withdrawing device onto a plurality of belts 66 which preferably carry said signature between two sets of oppositely-rotating wheels 67, one set of which is shown in Fig. 1ᵃ, provided on their peripheries with suction mouths 68 which apply suction to the respective folds of the signature, thus opening the same and depositing it on the saddle 54 along which it is carried by conveyer chain 52. Motion is imparted to said signature-opening wheels from shaft 47 through bevel gears 69 and 70, shaft 71 and bevel gears 72 and 73, the latter being carried by hollow shaft 74 on which are mounted one set of signature-opening wheels. Reverse movement is imparted to hollow shaft 75 on which is mounted the other set of signature-opening wheels by suitable gearing, one of the gears being shown at 76 in Figs. 1ᵃ and 3. As the particular mechanism for assembling the signatures forms no part of the present invention, the means for withdrawing the signatures from the hopper, opening the same and depositing them on the saddle 54 need not be more fully described, it being sufficient to indicate that the preferred form of mechanism for these purposes is shown, described and claimed in my application above referred to.

Preferably when the signature-assembling mechanism illustrated in my Patent No. 1,236,181 is employed, I associate with each one of the signature-withdrawing devices a calipering device, so that if more or less than the predetermined number of signatures is withdrawn from the hopper, or if a defective signature is withdrawn, this calipering device will act to automatically stop the machine by suitable mechanism, at the same time indicating, by a signal 77 (Fig. 3) at which hopper the attention of the operator is required. When such calipering devices are employed, they are preferably those described and claimed in my Patent No. 1,039,541, dated Sept. 24th, 1912, and as the specific form of said calipering devices which are associated with each hopper constitutes no part of the present invention, they need not be more specifically described.

In Fig. 27 the signals are shown mounted on a shaft 77a which, when rotated, opens the electric switch 77b. As set forth in detail in my said patent, this rotation is effected when the pawl *a* engages the arm or lug *b*. The signal 77 is thrown by the engagement of the pawl *a* with the arm or lug *c*.

*Operation of calipering mechanism.*—In order to guard against the passage of a defective book, which might be caused by an oversight of the operator, or the fact that a signature which is withdrawn from the hopper is not placed on the saddle, and to insure the delivery from the machine of perfect books, I provide a calipering means in association with the saddle 54 which engages the assembled signatures as they pass from under the last hopper, on their way to the stitching mechanism. As here shown the calipering member that engages the assembled signatures is a roller 78 which normally is slightly elevated above said saddle 54 to permit the easy passage thereunder of the said signatures (Fig. 8). In order to prevent the frictional engagement of said roller with the signatures from retarding the movement of the books, when said roller has been lowered, as hereinafter described, said roller is associated with a positively driven roller 79 which is rotated through bevel gears 80 and 81, the latter being mounted on one end of shaft 82 the other end of which carries gear 83 which meshes with gear 84 mounted on shaft 41 (Fig. 3).

Pivotally mounted at 85 on depending arms 86 attached to the machine frame (Figs. 5, 6, 7 and 8) is a bell-crank lever 87, the short arm of which carries said roller 78. The upwardly projecting arm 88 of said bell-crank lever has a pin and slot connection with a link 89 which in turn is connected to a rocking bell-crank lever, pivoted at 90 to the frame of the machine, the short arm 91 of said lever being connected to the link 89, which preferably is screw-threaded at each end, and engages nuts 92 and 93. Said link is also provided with a knurled wheel or surface 94 by means of which it may be turned for the adjustment of the parts. Said bell-crank lever is provided with a horizontal arm 95, said arm carrying on its outer end a laterally projecting squared lug 96 (see Fig. 9).

Mounted to reciprocate on the framework of the machine is a movable member, such as a T-shaped slide 97, which is held in place to reciprocate in suitable ways by means of a plate 98, and which has formed in its upper surface, and on the opposite end from the T, a transverse groove 99, Fig. 9. A lever 100, pivoted at 101 to the framework of the machine, projects upward, and on its upper end has a pawl 102 having a rounded nose engaging in the groove 99 on the sliding T-bar 97. Mounted on revolving shaft 49' is a cam 103 which engages lever 100, preferably through the medium of a friction roll 104. A spring 105 tends to throw the lever 100 from left to right (as seen in Fig. 6), and hold the lever in operative engagement with the cam 103. A spring 106 yieldingly holds the pawl 102 in engagement with the groove 99, and 107 is a spring normally tending to elevate the arm 95 of the bell-crank lever 91—95.

On one side of the sliding T-bar 97 there is formed a groove 108 the dimensions of which are such as to just receive freely and easily the squared lug 96 on the end of the lever 95 when a perfect book passes under the calipering roller 78. On the other side of said sliding T-bar 97 is a lug 109 provided with a curved or cam surface, the function of which will be hereinafter explained.

Mounted on shaft 49' is a pinion 110 which rotates therewith and meshes with a gear 111 which is twice as large as said pinion and which is mounted on a stub shaft 112, which latter is provided with suitable bearings in the frame of the machine. Secured to the back of said gear 111, as by screws 113, is an annular disk 114. Said gear and disk are provided with a plurality of alined openings 115, here shown as two, each of which carries a pin 116 on which are formed a plurality of annular grooves (see Fig. 10). A spring-pressed pin 117, mounted in a recess in said disk 114, is associated with each pin 116 and is adapted to engage one of said grooves to yieldingly hold the pin 116 in the desired position. The normal position of said pins 116 is illustrated in full lines in Fig. 10, but under normal conditions, that is to say, when perfect books are passing under the calipering roller 78, the rotation of said gear 111 and the reciprocation of said slide 97 are so timed that lug 109 and pins 116 will not engage one another. Said calipering roller 78, as above indicated, and as clearly shown in Fig. 8, slightly clears the surface of its companion roller 79 to permit the assembled signatures constituting the book to pass thereunder. It is maintained in this position as long as roller 118 (see Fig. 7), which is mounted on slotted lever 119 pivoted at 120 to arm 88, engages the unbroken surface of cam 121 mounted on shaft 49'. As soon, however, as the cut-away portion 122 of said cam is engaged by said roller 118, arm 88 will be rocked toward the left (Fig. 7) on pivot 85 under the influence of spring 123, one end of which is connected to arm 88 and the other anchored to the machine-frame, thus firmly applying the roller to said cut-away portion for a limited part of the movement of the assembled signatures under the calipering roller 78.

If, at the time the roller 118 engages cutaway portion 122, a defective book—for example, one having an insufficient number of signatures—is passing under calipering roller 78, the arm 95 is slightly lowered, so that the squared shoulder 124 (Fig. 9) of the groove 108 on the sliding bar 97 is engaged by the lug 96, and the sliding T-bar 97 is thus held against movement. On the other hand, if, at this time, the assembled signatures are numerically greater than the predetermined number, arm 95 will be rocked upwardly under the influence of spring 107, and lug 96 will engage the squared shoulder 125 of said T-bar 97, and said bar will be held against movement.

When the sliding bar is restrained from movement, by reason of the passage of a defective book under roller 78, the action of the cam 103 in forcing the lever 100 to the left (Fig. 6) causes the rounded nose on the pawl 102 to release its hold on the groove 99, the spring 106 yielding for this purpose, and the nose of the pawl then travels rearward on the upper face of the T-bar. At this time lug 109 is maintained stationary in the path of rotation of pins 116 carried by gear 111, and accordingly when the first pin 116 engages the cam surface of said lug 109, said pin will be moved to the position shown in dotted lines in Fig. 10, the spring-pressed pin 117 being forced out of the annular groove 126 provided around the middle of pin 116, thereafter engaging groove 127 and holding the pin 116 in said dotted line position. If the next book is a perfect one, it will be understood that, upon the succeeding oscillation of arm 100, pawl 102 will again engage recess 99 and slide 97 will again be caused to reciprocate. If, however, the next book is also defective, lug 109 will remain in the path of movement of pins 116, and will, upon the succeeding rotation of shaft 49', move the other pin 116, carried by said gear 111, in the manner above described.

Pivoted at 128 to the frame of the machine is a curved lever 129, which has associated therewith a lateral guide 130 and an adjustable screw 131, the function of the latter being to limit the movement of said lever. At its free end said lever is connected to one end of a link 132, the other end of said link being connected to one end of a lever 133 (Fig. 4ª) pivoted at 134 to the machine frame, the other end of said lever 133 being connected to a pin 135 the position of which determines whether or not the stitching mechanisms are in or out of operation. A spring 136 connected at one end to link 132 and at its other end to the frame of the machine, normally maintains said pin in the position shown in Fig. 4ª (i. e., protruded to the left) to insure the operation of the stitching mechanism. When, however, one of the pins 116 is moved to the position shown in dotted lines in Fig. 10, the continued rotation of gear 111 will force said pin into engagement with lever 129, thereby rocking the same and, through the connections described, moving pin 135 for disconnecting the stitching mechanism or mechanisms. As soon as pin 116 has rocked lever 129, it engages in a cam groove or depression 137 provided on the inside of said lever (Fig. 8), thus causing said pin to again assume the position shown in full lines in Fig. 10.

*Automatic operation of stitching mechanism.*—The driving of the stitching mechanism or mechanisms and the automatic disconnection of the same is effected by the following means, reference being had particularly to Figs. 4ª, 13, 14, 15 and 16:

As here shown, two wire stitchers of any suitable construction are employed, though it will be understood that one or a greater number than two might be employed. Power is applied to the shafts 138 of said stitchers by means of sprocket chain 139 passing around sprocket wheels 140 and 141 on the respective shafts 138 of the two stitchers, said sprockets 140 and 141 being carried by sleeves 142 loosely mounted on said shafts 138. Sprocket chain 139 also engages sprocket wheel 143 carried by shaft 144 which is rotated from shaft 45 through bevel gears 145 and 146 and gear 147 and pinion 148 or gear 149 and pinion 150, said pinions being mounted on shaft 144 and said gears 146, 147 and 149 on a shaft 150.

On shaft 138 of each stitcher is keyed a collar 151 on which is pivoted at 152 a pawl 153 provided with an enlarged laterally-extending rear portion 154 (Fig. 16). Power is applied to shafts 138 through said pawls 153, and in Fig. 14 the parts are shown in the position they occupy when the stitchers are operating, the nose 155 of said pawl at this time engaging in a recess 156 in casting 142, a spring 157 tending to hold the parts in this position. Pivoted at 158 to a bracket 159 is a lever 160 which, near its upper end, is provided with a finger 161 that projects laterally through a slot 162 in a recessed member 163, preferably integral with the frame, in which member slides a pin 164 engaged by a spring 165. Normally said pin 164 occupies the position shown in full lines in Fig. 13, at which time it is out of the path of movement of pawl 153, but when a defective book passes under the stitcher said pin 164 is moved out into the path of movement of said pawl, whereupon the tail 154 of said pawl is engaged by said pin, thus removing the nose 155 from recess 156 in casting 142, and disconnecting shaft 138 from the power.

As heretofore stated, the pin 164 is normally maintained in the position shown in full lines in Fig. 13. This is due to the engagement of a roller 166 in a recess 167 of a cam 168 carried by shaft 169. Said roller is mounted on one end of a slotted arm 170 through which shaft 169 projects, the other end of said arm being connected to the upper end of lever 160. When perfect books are being operated upon, shaft 169 remains stationary, but as soon as pin 135 is moved from the position shown in full lines in Fig. 4ª, said shaft 169 rotates in the direction of the arrow, Fig. 13, disengaging roller 166 from recess 167, whereupon pin 164 is forced out into the path of movement of pawl 153 under the influence of spring 165.

Loosely mounted on the normally-stationary shaft 169 is a sprocket 171 around which passes a sprocket chain 172 which also engages a sprocket 173 mounted on power shaft 45. Keyed to said sprocket 171 and also loose on shaft 169 is a gear 174 which meshes with a gear 175 fixedly secured on shaft 176 mounted in bearings in the machine frame. A limiting sleeve 177 is keyed to shaft 169 next to gear 174, and next to the hub of sprocket wheel 171 is a sleeve 178, keyed to shaft 169. Pivoted to said sleeve (see Fig. 15) is a pawl 179, similar to that illustrated in Fig. 16, the nose of said pawl being, however, normally out of engagement with a recess in the hub of sprocket 171, while its tail is normally pressed upward into engagement with pin 135 by spring 180. When said pin 135 is withdrawn from engagement with said pawl 179 upon the passage of a defective book, as heretofore described, the nose of said pawl 179 will, under the influence of spring 180, engage in a recess in the hub of sprocket 171 and the shaft 169 will rotate, thus disconnecting the stitching mechanism—or the first stitching mechanism, if a plurality is employed—as the defective book passes thereunder. If the succeeding book is a perfect one, upon the completion of one rotation of shaft 169 the roller 166 will again engage in recess 167, pin 164 will be withdrawn from the path of pawl 153, and the stitching mechanism will again operate by reason of the rotation of shaft 138 through pawl 153. If the succeeding book is also defective, shaft 169 will continue to rotate, and will not cease rotating until a perfect book is calipered.

As heretofore indicated, a single stitching mechanism might be employed, but preferably a plurality of stitching mechanisms are employed, and I have shown two in the accompanying drawings. When two stitchers are employed, it will be appreciated that the second stitcher must not be disconnected when the first stitcher is disconnected; in other words, it must not be disconnected until the defective book is passing the second stitcher. This necessitates the successive disconnecting of the stitchers so that the second stitcher can continue to operate on a good book until the defective book has passed from the first stitcher to the second stitcher. In order that this may be effected, a shaft 181, separate from shaft 169 but in line therewith, is provided, both of said shafts having one of their bearings in a standard 182. Keyed to said shaft 181 is a sleeve 183 on which is pivoted a pawl 184, similar to pawl 179, said pawl being adapted to engage in a recess in the hub of a gear 185 which latter meshes with a gear 186 on shaft 176, and a limiting collar 187 is also keyed to said shaft 181. Projecting through said standard 182 is a pin 188 which is maintained in the position shown in Fig. 15, with its point in engagement with the tail of pawl 184, by a spring 189, one end of which is secured to a pin 190 on standard 182 and the other end of which is connected to said pin 188. The head of said pin projects into the path of movement of cam 191, keyed to shaft 169, and after said shaft 169 has made one-half of a rotation, cam 191 engages the head 192 of said pin, moving it longitudinally and thus releasing pawl 184 which immediately snaps into the recess in the hub of loose gear 185. Shaft 181 is then rotated through shaft 176, gears 186 and 185, pawl 184 and sleeve 183. The mechanism for disconnecting the second stitcher upon the rotation of shaft 181 is identical with that for disconnecting the first stitcher from shaft 169.

*Automatic delivery mechanism.*—After the defective book has passed the stitchers, it is desirable that it be removed from the machine separately from the good or perfect books, and to this end I have provided an automatic delivery with means for effecting the discharge of the defective books by a separate path from those of the perfect books.

Referring particularly to Figs. 1, 2 and 4, it will be seen that power shaft 45 is provided on its end with a sprocket wheel 193, around which passes a sprocket chain 194, which chain also engages sprocket wheels 195 and 196, the former being mounted on a shaft 197 and the latter on shaft 198, both of which shafts are suitably mounted in the frame of the machine. Shaft 197 has keyed thereto a plurality of pulleys 199 around each of which passes a belt 200, said belts also passing around an elongated roller 201. A gear 202 is also mounted on shaft 197 and meshes with a gear 203 keyed to a counter-shaft 204, suitably mounted in the machine frame, and provided with a plurality of rollers 205 similar to pulleys 199 mounted on shaft 197, though by reason of the connection described, rotating in the opposite direction.

On shaft 45 (Fig. 4) is keyed a cam 206 which, on each revolution of said shaft, engages a roller carried by one arm of a lever 207 pivoted at 208 to a standard 209. The other arm of said lever is pressed downward by a spring 210, and at its end is suitably connected, as by a pivoted link 211, to an ejecting member 212 which slides through an opening in a standard 213 (Figs. 17 and 18) in a vertical plane passing through the apex of the inverted V-shaped saddle 54, which latter is provided with an opening 214. As the books are fed along said saddle, by means hereinafter described, they stop over said ejecting member 212 which, upon its next upward movement under the influence of cam 206, strikes the book and elevates the same into engagement with belts 200 and rollers 205. If the book is a perfect one, it will be carried by said belts, folded edge foremost, and deposited in a hopper 215 which is suitably mounted in the machine frame, said hopper being provided with a horizontally reciprocating block 216 (shown in dotted lines in Fig. 2) which is moved from eccentric 217, mounted on shaft 45, through any suitable connections. If, on the other hand, the book is a defective one which has not been stitched, it is desirable that the same be not delivered into the hopper with the good books, but that it be discharged in a separate path.

In order to effect the separation of the perfect and the defective books, shaft 176 (see Fig. 4) is provided on its end with a pinion 218 which meshes with a gear 219 loosely mounted on a short stub shaft 220 which has suitable bearings in standard 221. Said pinion 218 and gear 219 are as one to four. On the rear face of this gear 219 (Fig. 19) is secured, as by screws 222, a plate 223, and passing through alined openings in said gear and plate are a plurality of pins 224 provided with annular grooves 225 and 226, a spring-pressed pin 227 engaging in one or the other of the grooves of each pin. As here shown, four pins 224 are employed. When perfect books are being discharged, said pins occupy the position of the pin shown in Fig. 19.

On said stub shaft 220 is keyed a bushing 228 (Fig. 21), which carries a sleeve 229 which preferably has integrally formed thereon an arm 230 through the end of which passes a rod 231 provided at its end with a laterally-extending lug 232, provided with a cam surface. A compression spring 233 surrounds shaft 220, one end thereof bearing against the standard 221 and the other end engaging bushing 228. On shaft 181, which it will be recalled rotates only when a defective book is passing the second stitcher, is keyed a cam 181' which, when shaft 181 rotates, engages bushing 228 and moves the same against the force of spring 233, thus forcing lug 232 into the path of movement of the pins 224 carried by the continuously rotating gear 219. When the head of a pin 224 is engaged by the lug 232, it is moved so that the other end of said pin will, upon the continued rotation of gear 219, engage a lever 234 (Fig. 4) pivoted at 235 to the frame of the machine. The free end of this lever is connected to one end of a link 236, the other end of which latter is connected to an arm 237 secured to a rod 238 mounted in bearings in the machine frame above pulleys 199 and rollers 205. Suitably secured to said rod is a plurality of switches each of which is provided with a downwardly-projecting member 239 which is movable to one side or the other of the vertical path of movement of the book as it is elevated into engagement with belts 200 and rollers 205. Said switches are also provided with guide members 240 and 241, the former guiding the good books onto the belts 200 and the latter guiding the defective books outwardly around rollers 205. When, therefore, one of the pins 224 engages lever 234, rod 238 will be rocked moving the switch from the position shown in Fig. 17 to the position shown in Fig. 18, thus discharging the defective book from the machine in a separate path from that of the good goods. The switches are normally held in the position shown in Fig. 17 by spring 242 connected at one end to an arm 243 on the end of rod 238 and at the other end to standard 221.

As shown in Fig. 4, the gear 219 is provided with four pins 224, and rotates in the direction indicated by the arrow, and said gear 219 will rotate once for each four rotations of pinion 218. If, for example, the third pin 224 from the lever 234 is displaced by cam 232, that means that the third book back from the delivery (see Fig. 12) is the defective book, and when this book is elevated by the ejector 212, the switches will have been swung to the position indicated in Fig. 18, so that it will be discharged in the path of defective books. It will be observed that, after a finger 224 has engaged lever 234 to rock the same, it will then pass into a cam depression 234' (Fig. 19) which will return it to its normal position. It is also to be understood that if a succession of defective books pass under the calipering roller 78, the shaft 181 will continue to operate, which will cause lug 232 to engage successive pins 224, thus holding the switching mechanism in the position shown in Fig. 18 until a perfect book is to be delivered.

As the books made up of the assembled signatures are moved along the saddle 54 on their way to the calipering roller 78, by reason of the engagement therewith of pins 53 carried by conveyer chain 52, the front or advancing edges of the signatures that make up the books are engaged by means that aline said signatures, so that the edges thereof are in substantially the same vertical plane. Preferably, this alining device is a yielding one, and as here shown, an arm 242', which projects downwardly into the slot 214 formed at the apex of the saddle 54, is carried by a rod 243' which has bearings in a bracket 244 secured to the frame of the machine. Said rod 243' is surrounded by a spiral spring 245, one end of which is secured to a pin 246 carried by arm 242', and the other end is secured to a pin 247 carried by a disk 248 mounted on the end of rod 243'. This disk 248 is provided with a plurality of radial grooves 249, which are adapted to be engaged by a pin 250 fixedly secured to the end of rod 243'. The spring 245 can be adjusted by moving the disk 248 longitudinally against the action of said spring, and then rotating the same, the pin 250 being engaged in the proper groove to hold the spring under the desired adjustment.

The books are fed past the calipering roller by the conveyer chain 52, and are then engaged by a feeding mechanism that carries said books to and from the stitchers.

Referring particularly to Figs. 1, 1ª, 4ª, 22, 23 and 24, a reciprocating feed mechanism is shown, which is operated from power shaft 45. The books are engaged by dogs 251, each of which is pivoted at 252 on a base 253, which is provided with a beveled member 254 that is adjustable along a slide 255 in a beveled groove 256. Springs 257 hold said dogs in their uppermost position, so that lugs 258 will engage the rear edges of the signatures constituting the book. In moving to the position to engage the rear edges of the signatures, the lugs 258 slide under the group of signatures, engaging at this time the inner face of one of the leaves of the innermost signature. The dogs are secured in any desired position by means of nut 259 engaging screw 260 carried by the beveled member 254 and passing through the base 253. The slide 255 is mounted in a carrier 256' (Fig. 24) secured to the under side of one of the faces of the saddle 54 by suitable means, as screws 257' said carrier being provided with plates 258' that overlap slide 255 and hold it in place. The dogs 251 project through an opening 259' in the saddle so as to effectively engage the rear edges of the signatures constituting the books, and are reciprocated in this position as the result of movement imparted to slide 255.

Pivoted to the underside of said slide 255 in any suitable manner is a link 260, which latter is also suitably secured to a lever 261 which is pivoted to a base 262. Said lever is reciprocated from shaft 144 (Fig. 4ª) through eccentric block 263 and link 264. A pin 265 projects through an opening in the end of said link 264 and an enlargement thereon (not shown) is carried by said eccentric block 263, a screw 266 passing through the ends of said block and through said enlargement. The eccentricity of said link can be adjusted by turning said screw 266 and accordingly the length of stroke of the slide 255 is thus adjusted. Increased speed can be imparted to these parts, and also to the stitchers, by disconnecting gear 147 and pinion 148, which are in the relation of two to one, and engaging gear 149 and pinion 150 which are in the relation of three to one. It will be understood that different sizes of books may require different lengths of stroke of the slide of the feeding mechanism, and that the number of stitches that each book is to receive may also affect this adjustment. As here shown (Fig. 12) four stitches are given to each book, the second stitcher applying the third stitch while the first stitcher is applying the second stitch in the succeeding book; the book is then advanced another step when the second stitcher applies the first stitch while the first stitcher applies the fourth stitch on the same book. It is desirable to maintain the space of an inch between the books on the saddle after they leave the calipering mechanism, and it will be understood that in order to so stitch a book that is, for example, seventeen inches long, the stroke of the slide should be nine inches.

In order to firmly hold the books against movement while the stitches are being applied, there is provided a holding means that automatically grips the books at the proper time, and then releases them for the succeeding feeding operation.

As shown in Fig. 4ª, a vertically disposed arm 267, spring-pressed downwardly by spring 268, is provided at its lower end with a roller 269 that rides on a cam 270 carried by shaft 144. The upper end of this arm is provided with a pin 271 which projects through the slotted end of a lever 272 secured at its other end to a rod 273 suitably mounted in the frame of the machine. Carried by said rod 273 is a plurality of arms 274 to the free ends of which are secured grooved rollers 275 that bear upon the books at the apex of the saddle. The cam 270 is so timed that the rollers bear on the books as the stitches are applied, but are elevated out of engagement therewith when the next feeding movement is to take place. The play between the arm 267 and lever 272, by reason of the engagement of pin 271 in the slotted end of arm 267 permits the grooved rollers 275 to be elevated by hand when desired.

In order to maintain the books flat and in the best possible condition as they pass to, under and past the switching mechanisms, a horizontal guide is provided. As here shown (see particularly Figs. 1, 1ª, 2 and 24), said guide consists of a rod 276 that is mounted on the end of arms 277, secured to the machine frame, and is held in yielding engagement with the books by means of springs 278. The arms 277 (Fig. 2) are pivoted to the machine frame at 279, and the position thereof may be adjusted by set screws 280. As shown in Fig. 24, the lugs 258 of dogs 251 pass on either side of said rod 276.

After the books pass the stitching mechanism, they are engaged by a second reciprocating feed device for presenting them to the delivering mechanism. Whereas the feeding means for moving the books to and past the stitching mechanisms were provided with a plurality of dogs 251, preferably six, the length of stroke of the slide carrying the same being determined by the number and distance between the stitches to be applied to each book, this second feeding means is provided with but a single dog and the length of stroke of the slide on which it is mounted is sufficient to move each book from the last stitcher over the ejector 212. This second feeding mechanism is also operated from power shaft 45. As shown in Fig. 4, power is applied to shaft 281 through bevel gears 282 and 283. This shaft 281 has bearings in standard 284, and on the free end thereof is mounted an eccentric block 285, similar to block 263, a link 286 being adjustable along said block by means of screw 287. The other end of said link is connected to a lever 288 pivoted at its lower end in a bearing 289. To the upper end of said lever is connected one end of a link 290, the other end of which is pivoted to a downwardly-projecting arm 291 integrally formed on a sleeve 292 which is adapted to reciprocate along a suitably supported guide rod 293. This sleeve is provided with a beveled groove 294 (Fig. 26) along which dog 295 is adjustable. This dog and its adjusting means are substantially identical with the dogs 251, except that dog 295 is preferably provided with a lug 296 that engages over the rear end of the book.

It will therefore be appreciated that books, made up of signatures assembled in any desired manner are automatically calipered; that upon the passage of a defective book under the calipering device the stitchers are automatically and successively disconnected when the defective book passes the same, so that said defective book will not be stitched, means controlled by the calipering device effecting this result; and that when the defective book has reached the delivering mechanism, it is automatically discharged therefrom in a separate path from that of the perfect books, this separation of the defective and the perfect books being also effected as the result of means controlled by the calipering device.

By the expressions "perfect book" and "good book" are meant books made up of the desired number of signatures; and by the expression "defective book" is meant one made up of a greater or less number of signatures than desired.

While, for the purpose of clearness, one embodiment of the inventive idea has been herein described and illustrated in detail, it is apparent that the invention is not restricted to the particular structural embodiment which is illustrated and described, but that it is susceptible of embodiments conforming to the definition of the invention given in the claims which follow.

What is claimed is:—

1. The combination of a support along which books of assembled signatures are automatically moved, a stitching mechanism normally operating on the books while on the support, a calipering device acting upon the assembled signatures on the support prior to the operation thereon of the stitching mechanism, and means controlled by the calipering device for disconnecting the stitching mechanism upon the passage of a defective book.

2. In combination, means for holding assembled signatures and for moving them along a fixed path, a calipering device for the signatures on the holding and moving means, a plurality of stitching mechanisms normally operating to stitch the assembled signatures while on the holding and moving means, and means automatically operated by the calipering device for successively throwing the stitching mechanisms out of operation.

3. In combination, means for holding books of opened assembled signatures and for moving the books along a fixed path, a stitching mechanism normally operating to stitch the assembled signatures while on the holding and moving means, a calipering device engaging the assembled opened signatures on the holding and moving means, means adapted to be set by the calipering device upon the passage of a defective book, and connections between the stitching mechanism and the said set means whereby the former is disconnected by the latter when a defective book passes the stitching mechanism.

4. In combination, a stitching mechanism, means for holding books of assembled opened signatures and for moving the books into operative relation with the stitching mechanism, a rotatable element, a plurality of displaceable stops carried thereby, a reciprocatory member, a calipering device for the assembled opened signatures on the holding and moving means operating to stop the reciprocatory member upon the passage of a defective book whereby one of the stops is displaced, and means operated by the displaced stop to disconnect the stitching mechanism when the defective book passes the same.

5. In combination, a stitching mechanism, means for holding books of assembled opened signatures and for moving the book into operative relation with the stitching mechanism, a calipering device for the assembled opened signatures on the holding and moving means controlling the operation of the stitching mechanism, a normally stationary shaft, connections between the calipering device and the shaft, and connections between the stitching device and the shaft, the said connections including means whereby the stitching mechanism will be disconnected upon the rotation of the shaft.

6. The combination of means for receiving and holding books of assembled signatures and for moving the books along a fixed path, a stitching mechanism normally operating to stitch the books while on the holding and moving means, a calipering device acting upon the assembled signatures on the holding and moving means prior to the operation thereon of the stitching mechanism, means controlled by the calipering device for disconnecting the stitching mechanism upon the passage of a defective book, and means controlled by the calipering device for discharging defective books from the holding and moving means along a path separate from that of perfect books.

7. In combination, means for holding books of assembled signatures and for moving the books along a fixed path, a calipering device for the signatures on the holding and moving means, a plurality of stitching mechanisms normally operating to stitch the assembled signatures while on the holding and moving means, means automatically operated by said calipering device for successively disconnecting the stitching mechanisms, and means automatically operated by the calipering device for discharging defective books from the said holding and moving means in a separate path from that of the perfect books.

8. The combination, means for holding assembled opened signatures and for moving them along a fixed path, a calipering device for the assembled opened signatures on the said holding and moving means, a stitcher for the assembled opened signatures on the holding and moving means, a rotary member provided with a plurality of stops, means for guiding perfect books from the holding and moving means in one path and defective books in another, a normally stationary shaft in operative connection with the stitcher and the rotary member, means carried by the shaft for disconnecting the stitcher, connections between the rotary member and the calipering device whereby one of the stops is set upon the passage of a defective book thus causing the rotation of the shaft, and means operated by the set stop for shifting the guiding means.

9. The combination of means for receiving and holding books of assembled signatures and for moving the books along a fixed path, a stitching mechanism normally operating on the books while on the said holding and moving means, a calipering device acting upon the assembled signatures, and means controlled by the calipering device for discharging defective books from the holding and moving means along a path separate from that of perfect books.

10. In combination, means for holding books of assembled signatures and for moving them along a fixed path, a calipering device for the assembled opened signatures on the holding and moving means, means for guiding perfect books from the holding and moving means in one path and defective books in another, a normally stationary shaft, connections between the shaft and the calipering device whereby the former is rotated upon the passage of a defective book, and connections between the shaft and guiding means whereby the latter are controlled by the calipering device.

11. In combination, a support upon which signatures are straddled and assembled and along which they are moved, a calipering device engaging the assembled signatures on the support, a stitching mechanism normally operating to stitch the assembled signatures while on the support, and means automatically operated from the calipering device for disconnecting the stitching mechanism upon the passage of a defective book.

12. In combination, a support on which signatures are deposited and assembled and along which they are moved, a calipering device for the assembled signatures on the support, a plurality of stitching mechanisms normally operating to stitch the assembled signatures while on the support, and means automatically operated by the calipering device for disconnecting the stitching mechanisms upon the passage of a defective book, and progressing said books along a path different from that of perfect books.

13. In combination, a support upon which signatures are deposited and assembled and along which they are moved, a calipering device engaging the assembled signatures on the support, a stitching mechanism normally operating to stitch the assembled signatures while on the support, means automatically operated from said calipering device for throwing said stitching mechanism out of operation upon the passage of a defective book, and means automatically operated from said calipering device for discharging defective books by a path separate from that of perfect books.

14. In combination, a support on which signatures are deposited and assembled and along which they are moved, a calipering device engaging the assembled signatures on the support, a plurality of stitching mechanisms normally operating to stitch the assembled signatures while on the support, means automatically operated by the calipering device for disconnecting the stitching mechanisms upon the passage of a defective book, and means automatically operated by the calipering device for discharging defective books from the support in a path separate from that of perfect books.

15. In combination, a support upon which signatures are deposited and assembled and held open and along which they are moved, a calipering mechanism for assembled opened signatures on the support, an automatic means for delivering assembled signatures from the support, guiding means normally set to discharge perfect books in one path, and means operated from the calipering device to shift the guiding means to discharge defective books in a separate path.

16. In combination, a support upon which a plurality of signatures are deposited and assembled and along which they are moved, calipering means acting on each of the signatures prior to the assembling thereof, means controlled by the calipering means for stopping the entire machine, a stitching mechanism normally operating on the books while on the support, a calipering device acting upon the assembled signatures on the support prior to the operation thereon of the stitching mechanism, and means controlled by the calipering device for disconnecting the stitching mechanism upon the passage of a defective book.

17. In combination, a continuous conveyer, a stitching mechanism, reciprocatory means automatically receiving the books from the continuous conveyer and feeding them to and from the stitching mechanism, an automatic delivery, and a second reciprocatory means feeding the books to the delivery.

18. In combination, a support upon which signatures are deposited and assembled and held open and along which they are moved, a stitching mechanism normally operating to stitch assembled opened signatures while on the support, a calipering device for the assembled opened signatures on the support, the said device controlling the operation of the stitching mechanism, and an alining means operating on the assembled signatures before they reach the calipering device.

19. A bookbinding machine comprising a supporting table, mechanism for alining the sheets of a book during their continuous progress along the supporting table without stopping the progress of the sheets along said table, means for binding the sheets to form a book, means for conveying the sheets from the alining device past said binding means during the binding operation, means for delivering the book from the machine after it is bound, and means for conveying the book from the binding-conveying means to the delivery means.

20. A bookbinding machine comprising a supporting table, mechanism for alining the sheets of books during their continuous progress along the supporting table without stopping the progress of the sheets along said table, means for binding the book, means for intermittently conveying the sheets to said binding means and away from the same, and means for delivering the book from the machine after it is bound.

21. A bookbinding machine comprising a supporting table, a device for alining the sheets of books during their continuous progress over said table without stopping the progress of the sheets along said table, a plurality of binders, means for conveying the sheets from said alining device to dispose them adjacent the binders, means for conveying them past the binders, and means for delivering the books from the machine after they are bound.

22. A bookbinding machine comprising a supporting table, a device for alining the sheets of the books during their progress over said table, a plurality of binders, means for conveying the books from said alining device to dispose them adjacent the binders, means for intermittently conveying them past the binders, and means for delivering them from the machine after they are bound.

23. A bookbinding machine comprising a support, mechanism for alining the sheets of a book during their continuous progress along the support without stopping the progress of the sheets along said support, means for binding the sheets to form a book, means for conveying the sheets from the alining device past said binding means during the binding operation, means for delivering the book from the machine after it is bound, and means for conveying the book from the binding-conveying means to the delivery means.

24. A bookbinding machine comprising a support, mechanism for alining the sheets of books during their continuous progress along the support without stopping the progress of the sheets along said support, means for binding the book, means for intermittently conveying the sheets to said binding means and away from the same, and means for delivering the book from the machine after it is bound.

25. A bookbinding machine comprising a support, a device for alining the sheets of books during their continuous progress over said support without stopping the progress of the sheets along said support, a plurality of binders, means for conveying the sheets from said alining device to dispose them adjacent the binders, means for conveying them past the binders, and means for delivering the books from the machine after they are bound.

26. A bookbinding machine comprising a support, a device for alining the sheets of the books during their progress over said support, a plurality of binders, means for conveying the books from said alining device to dispose them adjacent the binders, means for intermittently conveying them past the binders, and means for delivering them from the machine after they are bound.

27. The combination of means for receiving and holding books of assembled signatures and for moving the books along a fixed path, a stitching mechanism normally operating to stitch the books while on the holding and moving means, a calipering device acting upon the assembled signatures on the holding and moving means prior to the operation thereon of the stitching mechanism, and means controlled by the calipering device for discharging defective books from the holding and moving means along a path separate from that of perfect books.

28. The combination of means for receiving and holding books of assembled signatures and for moving the books along a fixed path, a calipering device acting upon the assembled signatures, and means controlled by the calipering device for discharging defective books from the holding and moving means along a path separate from that of perfect books.

29. In combination, a support upon which a plurality of signatures are deposited and assembled and along which they are moved, calipering means acting on each of the signatures prior to the assembling thereof, means controlled by said calipering means for stopping the entire machine, a calipering device acting upon the assembled signatures on the support, and means controlled by said calipering device for separating the perfect from the defective books.

30. In combination, a plurality of hoppers for signatures, a saddle associated therewith, means for withdrawing signatures from said hoppers and depositing them astraddle the saddle, a caliper for each hopper, calipering mechanism arranged adjacent the saddle and operating on groups of signatures, stitching mechanism, and means controlled by said calipering mechanism for disconnecting the stitching mechanism upon the passage of a defective book.

31. In combination, a plurality of hoppers for signatures, a saddle associated therewith, means for withdrawing signatures from said hoppers and depositing them astraddle the saddle, a caliper for each hopper, calipering mechanism arranged adjacent the saddle and operating on groups of signatures, and means controlled by said calipering mechanism for separating the perfect from the defective books.

32. In combination, a plurality of hoppers for signatures, a saddle arranged thereunder, means for simultaneously withdrawing signatures from said hoppers and depositing them astraddle the saddle, means for conveying signatures along the saddle, a caliper for each hopper, and calipering mechanism positioned adjacent the saddle and operating on assembled groups of signatures, stitching mechanism operating on the signatures as they are moved along the saddle, and delivery mechanism comprising a switch arranged above the saddle, means controlled by said calipering mechanism for moving said switch whereby perfect books are discharged in one path and imperfect books in another path, and means for elevating the books from the saddle and discharging them through the proper path.

33. In combination, a plurality of hoppers for signatures, a saddle positioned therebeneath, means for simultaneously withdrawing signatures from said hoppers and depositing them astraddle the saddle, means for moving the deposited signatures along said saddle whereby they are inset one within another, a caliper for each hopper, and calipering mechanism operating on the groups of assembled signatures, stitching mechanism and delivery mechanism positioned adjacent the saddle, and means controlled by said calipering mechanism for disconnecting said stitching mechanism upon the passage of a defective book and for operating said delivery mechanism to discharge said defective book in a path separate from that in which perfect books are discharged.

In testimony whereof, I have signed this specification in the presence of two subscribing witnesses.

EDWARD R. KAST.

Witnesses:
E. H. McLACKLEN,
W. B. KERKAM.